United States Patent [19]

Igarashi

[11] Patent Number: 5,893,385

[45] Date of Patent: Apr. 13, 1999

[54] LIQUID DISCHARGING DEVICE FOR DISCHARGING LIQUID STORED ON A BOTTOM WALL OF AN INTERIOR OF A COMPRESSED NATURAL GAS TANK OF A VEHICLE

[75] Inventor: Kouhei Igarashi, Susono, Japan

[73] Assignee: Toyota Jidosha Kabushiki Kaisha, Toyota, Japan

[21] Appl. No.: 08/908,693

[22] Filed: Aug. 8, 1997

[30] Foreign Application Priority Data

Aug. 8, 1996 [JP] Japan .................................. 8-210116

[51] Int. Cl.⁶ .................................................... F04F 1/06
[52] U.S. Cl. ...................... 137/203; 123/527; 137/209; 137/210; 137/558; 137/579
[58] Field of Search ............................. 137/209, 203, 137/210, 558, 579, 204; 123/527

[56] References Cited

U.S. PATENT DOCUMENTS

| | | | |
|---|---|---|---|
| 1,537,792 | 5/1925 | Aucutt | 34/125 |
| 3,916,936 | 11/1975 | Villaume et al. | 137/204 |
| 4,437,813 | 3/1984 | Ingram | 123/527 X |
| 5,025,758 | 6/1991 | Djurdjevic | 123/527 |
| 5,163,409 | 11/1992 | Gustafson et al. | 123/527 X |
| 5,353,835 | 10/1994 | Mills | 137/204 |

FOREIGN PATENT DOCUMENTS 6-264821  9/1994  Japan .

*Primary Examiner*—Gerald A. Michalsky
*Attorney, Agent, or Firm*—Oblon, Spivak, McClelland, Maier & Neustadt, P.C.

[57] ABSTRACT

According to the present invention, there is provided a liquid discharging device for discharging liquid stored on a bottom wall of an interior of a compressed natural gas tank of a vehicle, comprising a liquid discharging pipe for discharging the liquid from the compressed natural gas tank to an outside of the compressed natural gas tank. The liquid discharging pipe has an open end which is open into the interior of the compressed natural gas tank at a position adjacent to an inner face of the bottom wall of the compressed natural gas tank. Further, the liquid discharging device comprises a liquid discharging control valve arranged in the liquid discharging pipe to discharge the liquid due to the pressure of the natural gas when the liquid discharging control valve is opened.

10 Claims, 3 Drawing Sheets

LIQUID DISCHARGING DEVICE FOR DISCHARGING LIQUID STORED ON A BOTTOM WALL OF AN INTERIOR OF A COMPRESSED NATURAL GAS TANK OF A VEHICLE

BACKGROUND OF THE INVENTION

1. Field of the Invention

The invention relates to a liquid discharging device for discharging liquid stored on a bottom wall of an interior of a compressed natural gas tank of a vehicle.

2. Description of the Related Art

In recent years, an engine of a vehicle using natural gas as fuel has been developed since an engine using natural gas generates less $NO_x$ and $CO_2$ which cause a public hazard. For example, Japanese Unexamined Patent Publication No. 6-284821 discloses a compressed natural gas engine (CNG engine) which stores an amount of compressed natural gas in a compressed natural gas tank (CNG tank), extracts the compressed natural gas from the CNG tank, and reduces the pressure of the compressed natural gas by a regulator to use the natural gas as the fuel for the engine.

Water included in the natural gas is stored for a long time in the CNG tank which has a cylindrical central portion and opposed end portions connected to the central portion. Further, oil, from a compressor to the CNG tank when the compressor is activated to fill the CNG tank with the natural gas at high pressure, is mixed with the natural gas and is stored in the CNG tank. When the liquid such as water or oil included in the natural gas enters into the regulator, the liquid freezes due to the reduction in pressure of the natural gas by the regulator to cause damage to the regulator. At present, for the safety of the CNG tank, a liquid discharging opening for draining the water or oil cannot be provided in the bottom wall of the central portion of the CNG tank. Therefore, a complex operation of removing the CNG tank from the vehicle to discharge the liquid from the CNG tank is necessary.

SUMMARY OF THE INVENTION

Accordingly, the object of the invention is to provide a liquid discharging device for discharging liquid stored on a bottom wall of an interior of a compressed natural gas tank of a vehicle, which is simple and allows easy discharge of the liquid from the compressed natural gas tank.

According to the present invention, there is provided a liquid discharging device for discharging liquid stored on a bottom wall of an interior of a compressed natural gas tank of a vehicle, comprising: a liquid discharging pipe for discharging the liquid from the compressed natural gas tank to an outside of the compressed natural gas tank, the liquid discharging pipe having an open end which is open into the interior of the compressed natural gas tank at a position adjacent to an inner face of the bottom wall of the compressed natural gas tank, and a liquid discharging control valve arranged in the liquid discharging pipe to discharge the liquid due to the pressure of the natural gas in the compressed natural gas tank when the discharging control valve is opened.

Further, according to the present invention, the compressed natural gas tank comprises a cylindrical central portion and opposed end portions, and the liquid discharging pipe extends through one of the opposed end portions.

Further, according to the present invention, an outlet and inlet pipe is arranged to extend through the one of the opposed end portions for supplying natural gas into the compressed natural gas tank and extracting the natural gas from the compressed natural gas tank to an engine of a vehicle.

Further, according to the present invention, a liquid level sensor is provided for detecting a level of the liquid in the compressed natural gas tank.

Further, according to the present invention, the compressed natural gas tank is inclined relative to the horizontal in such a manner that the liquid is collected around the open end of the liquid discharging pipe.

Further, according to the present invention, the liquid discharging pipe has a deformable portion which is deformed due to the force of gravity when the deformable portion is inserted into the compressed natural gas tank.

Further, according to the present invention, the deformable portion is comprised of a flexible rubber tube.

Further, according to the present invention, the deformable portion is comprised of a bellows-shaped tube.

Further, according to the present invention, a filter is arranged on the open end of the liquid discharging pipe.

The present invention may be more fully understood from the description of the preferred embodiments of the invention set forth below, together with the accompanying drawings.

DESCRIPTION OF THE PREFERRED EMBODIMENTS

Figure 1:
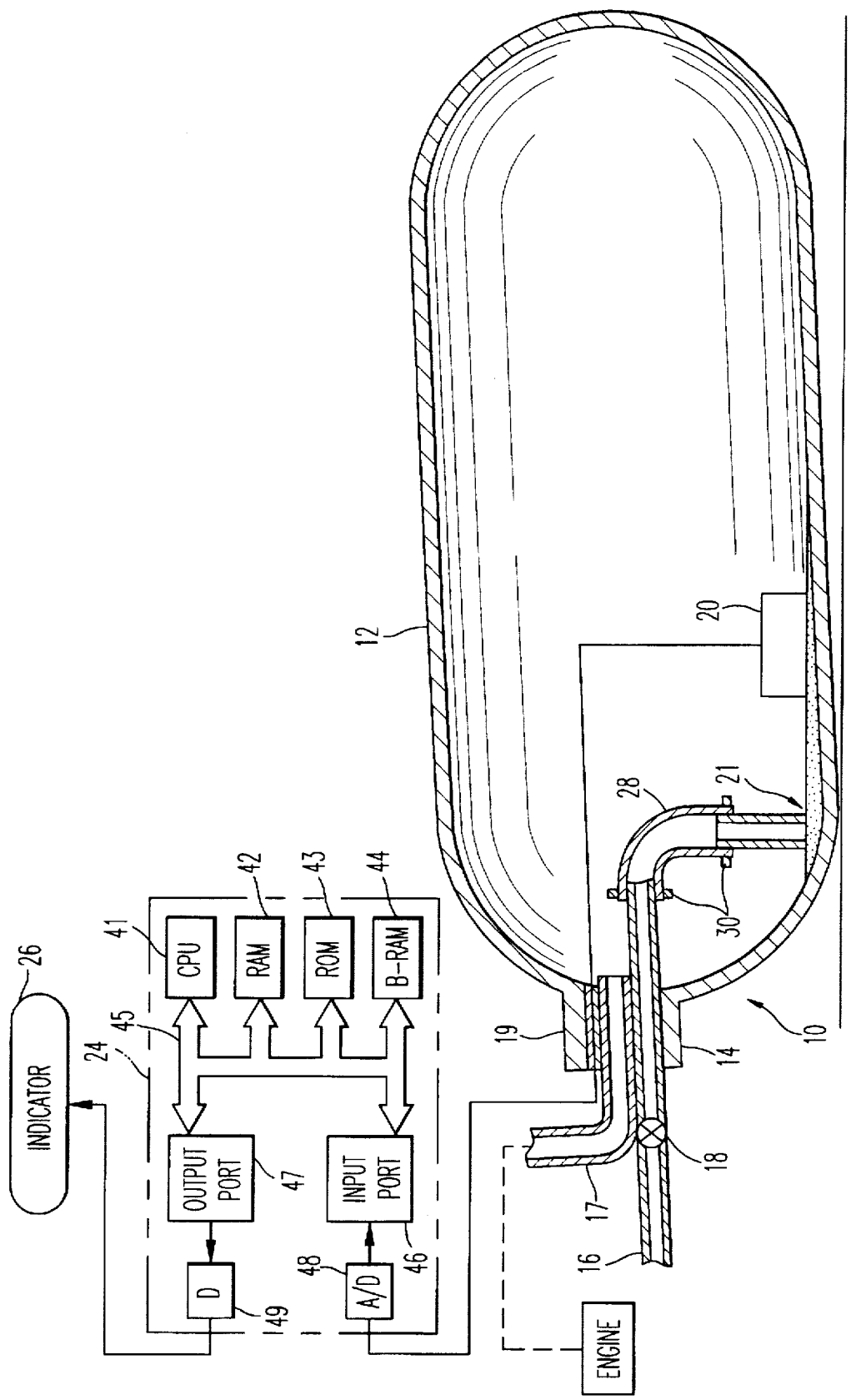
FIG. 1 is a view of the liquid discharging device according to the invention.

The invention will be understood from following description and by referring to the drawings. FIG. 1 is a view of a liquid discharging device 10 according to the first embodiment of the invention. The liquid discharging device 10 comprises a compressed natural gas tank (CNG tank) 12. The CNG tank 12 has a cylindrical central portion 13 and opposed end portions 15 and 25 connected to the central portion 13. These portions 13, 15 and 25 define an interior 23 in the CNG tank 12 together. Natural gas is enclosed in the interior 23 of the CNG tank 12 after being compressed to a high pressure. The CNG tank 12 is installed in the vehicle in such a manner that a bottom wall of the interior 23 or the central portion 13 of the CNG tank 12 is inclined relative to the horizontal. Therefore, one of the opposed end portions 15 of the CNG tank 12 is lower than the other of the opposed end potion 25 of the CNG tank 12.

The natural gas includes water vapor. Further, when a compressor (not shown) is operated to compress and supply the natural gas to the CNG tank 12, some oil used in the compressor enters into the interior 23 of the CNG tank 12. Therefore, liquid such as water or oil is stored on the bottom wall 11 of the CNG tank 12. The liquid is collected at the lowest position of the interior 23 of the CNG tank since the bottom wall of the interior 23 or the central portion 13 of the CNG tank 12 is inclined relative to the horizontal.

An inlet and outlet opening 14 is arranged on the one opposed end portion 15 which is lower than the other opposed end portion 25. The inlet and outlet opening 14 extends through the one opposed end portion 15 of the CNG tank 12.

An inlet and outlet pipe 17 is inserted into the opening 14. The inlet and outlet pipe 17 is open into the interior 23 of the CNG tank 12 at a position adjacent to the opening 14. The natural gas is supplied from a source on the exterior of the CNG tank 12 to the CNG tank 12 by the compressor via the inlet and outlet pipe 17 to replenish the CNG tank 12. The natural gas in the CNG tank 12 is supplied from the CNG tank 12 to the engine via the inlet and outlet pipe 17.

A liquid discharging pipe 16 is also inserted into the opening 14. One open end 21 of the liquid discharging pipe 16 is open into the interior of the CNG tank 12 at a position adjacent to the lowest position of the interior 23 of the CNG tank and adjacent to an inner face 27 of the bottom wall 11 of the CNG tank 12. Therefore, the liquid is collected around the open end 21 of the liquid discharging pipe 16. The other open end 29 of the liquid discharging pipe 16 is open to the outside air. The liquid discharging pipe 16 is downwardly bent in the interior of the CNG tank 12.

The liquid discharging pipe 16 has a deformable portion, such as flexible rubber tube 28 having resilience. The tube 28 can be deformed, i.e., bent downwardly toward the inner face 27 of the bottom wall 11 of the CNG tank 12 due to the force of gravity when the liquid discharging pipe 16 is inserted into the interior 23 of the CNG tank 12. The tube 28 is connected to the liquid discharging pipe 16 by a fastening means such as clamp 30.

Figure 2:
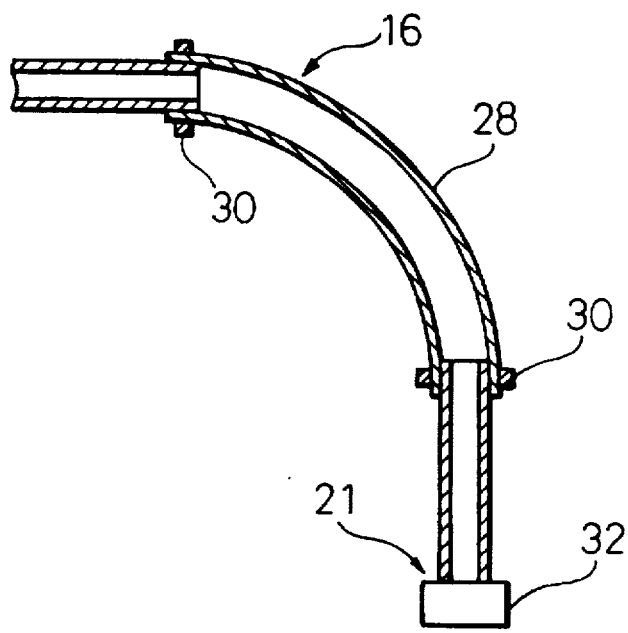
FIG. 2 is a view of a part of the liquid discharging pipe according to the first embodiment of the invention.

A filter 32 is arranged on the open end 21 of the liquid discharging pipe 16 (see FIG. 2). The filter 32 filters foreign objects entering into the CNG tank 12 to prevent the foreign objects from clogging the liquid discharging pipe 16 during discharging the liquid from the CNG tank 12.

The opening 14 is sealed with a sealing member 19.

A liquid discharging control valve 18 is arranged in the liquid discharging pipe 16 outside of the CNG tank 12. The interior 23 of the CNG tank 12 is in communication with the outside air via the liquid discharging pipe 16 when the valve 18 is opened.

A liquid level sensor 20 is arranged at a position adjacent to the inner face of the bottom wall of the CNG tank 12 and adjacent to the open end 21 of the liquid discharging pipe 16. The sensor 20 detects the level of the liquid in the CNG tank 12.

An electronic control unit (ECU) 24 has a digital computer and comprises a central processing unit 41 (CPU), a random access memory 42 (RAM), a read-only memory 43 (ROM), a back up RAM 44 (B-RAM), an input port 46, and an output port 47. These components are interconnected by a bidirectional bus 45. The sensor 20 is connected to the input port 46 via signal line 22, and the output voltage of the sensor 20 is input into the input port 46 via an A-D converter 48. An indicator 26 is connected to the output port 47 via a drive circuit 49.

In the operation of discharging the liquid from the CNG tank according to the invention, the sensor 20 sends a signal to the ECU 24 when the sensor 20 detects the level of the liquid equal or larger than the predetermined level. Then, the indicator 26 indicates that the level of the liquid equal or larger than the predetermined level is stored in the CNG tank 12 and it is necessary to discharge the liquid from the CNG tank 12. When the valve 18 is opened, the liquid is discharged from the CNG tank 12 via the liquid discharging pipe 16 to the exterior of the CNG tank 12 due to the pressure of the natural gas in the CNG tank 12. According to the first embodiment of the invention, a simple operation such as the opening of the valve 18 allows to discharge the liquid from the CNG tank 12 due to the pressure of the natural gas in the CNG tank 12.

Figure 3:
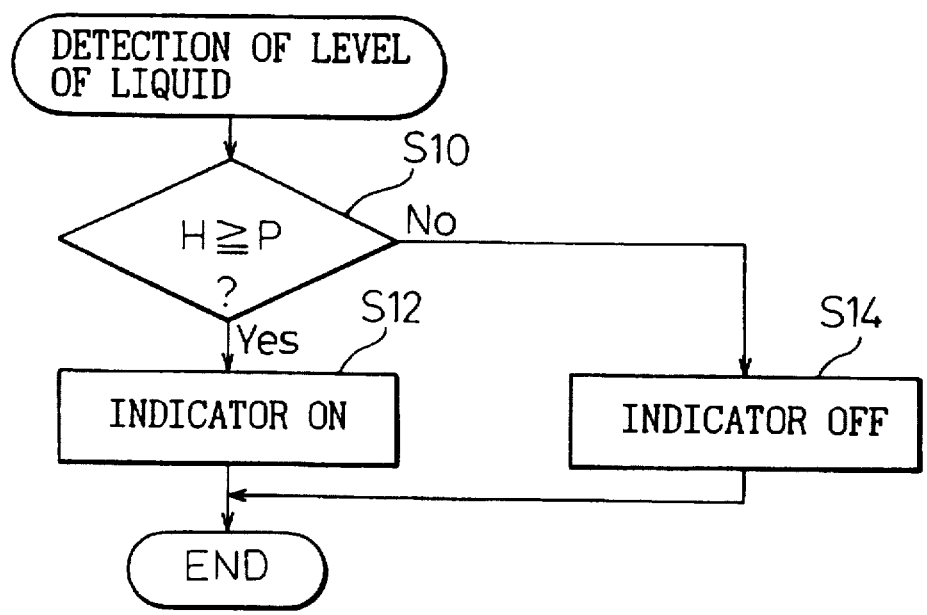
FIG. 3 is a flowchart of detecting the level of liquid in the compressed natural gas tank according to the invention.

FIG. 3 is a flowchart of detecting the level of the liquid in the liquid discharging device 10 according to the first embodiment of the invention. At step S10, it is judged if the level H of the liquid in the CNG tank 12 is equal or larger than the predetermined level P. At step S10, when the level H is equal or larger than the predetermined level P, the routine proceeds to step S12, where the indicator 26 is switched on and the processing cycle is ended. On the other hand, at step S10, when the level H is smaller than the predetermined level P, the routine proceeds to step S14, where the indicator 26 is switched off and the processing cycle is ended.

Figure 4:
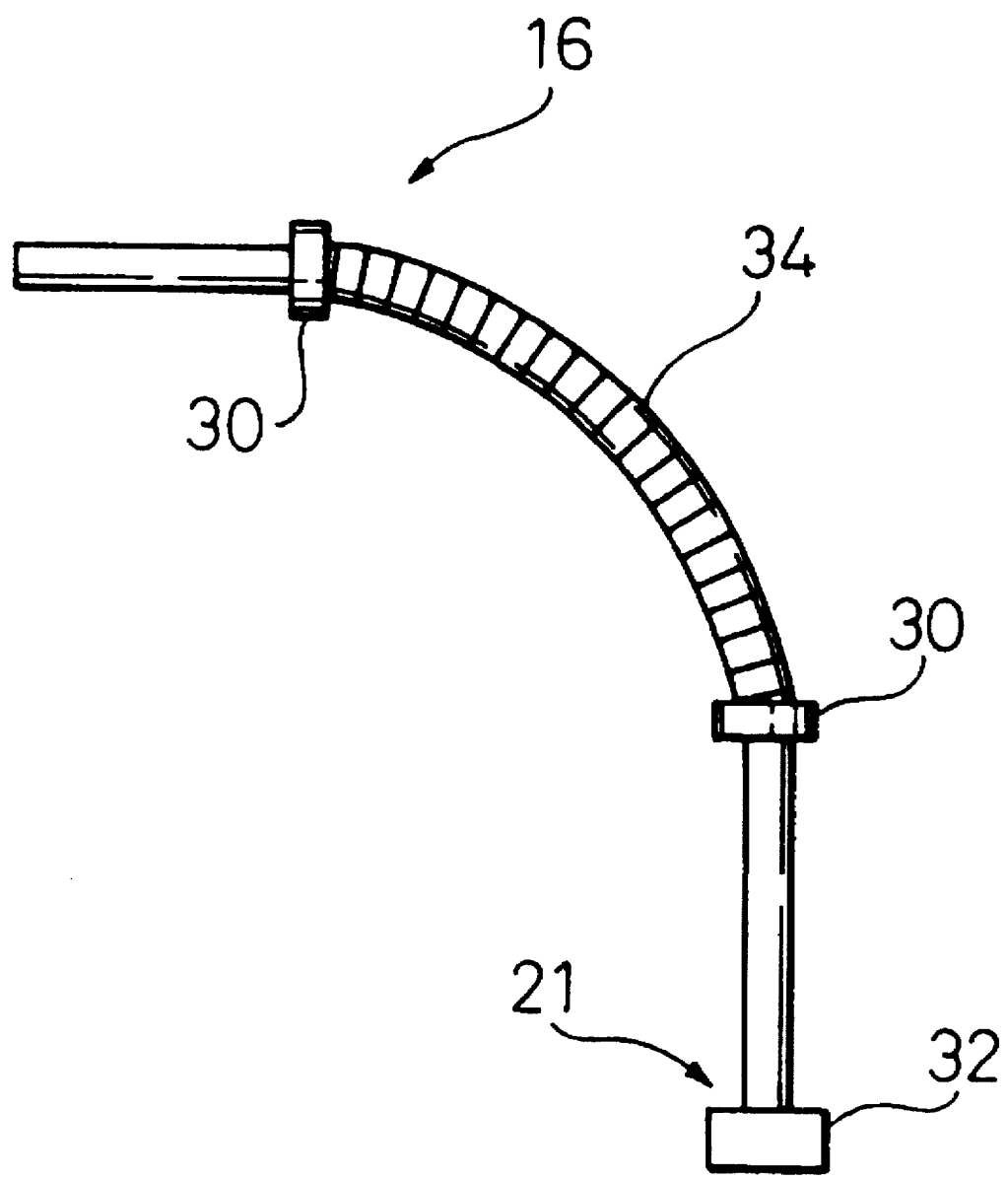
FIG. 4 is a view of a part of the liquid discharging pipe according to the second embodiment of the invention.

FIG. 4 is a view of the deformable portion of the liquid discharging pipe 16 according to the second embodiment of the invention. In the second embodiment, the deformable portion has a bellows shaped flexible tube 34. The flexible tube 34 comprises a cylindrical wall. The tube 34 can be deformed, i.e., bent downwardly toward the inner face 27 of the bottom wall 11 of the CNG tank 12 due to the force of gravity when the liquid discharging pipe 16 is inserted into the interior 23 of the CNG tank 12. Similar to the first embodiment, the flexible tube 34 is connected to the liquid discharging pipe 16 by a fastening means such as clamp 30, and a filter 32 is arranged on the open end 21 of the liquid discharging pipe 16.

In the above, the liquid discharging pipe is only used to discharge the liquid stored on the bottom wall of the CNG tank. However, the invention is not limited to this. The liquid discharging pipe can be used as a natural gas filling pipe for filling the CNG tank with the natural gas. Therefore, in this case, a member for filling the CNG tank with the natural gas can be eliminated.

Further, in the prior art, the outlet and inlet pipe for natural gas inserted into the outlet and inlet opening formed in one of the opposed end portions of the CNG tank, at the interior of the CNG tank, is a single pipe, and at the exterior of the CNG tank, is divided into two pipes, i.e., one of the pipes is a natural gas filling pipe and the other of the pipes is a natural gas extracting pipe. However, in the above mentioned case such that the liquid discharging pipe is used as a natural gas filling pipe, the liquid discharging pipe provides for the function to discharge the liquid from the CNG tank, and the complex structure, in the prior art in that the natural gas outlet and inlet pipe is divided into two pipes at the exterior of the CNG tank, is eliminated.

While the invention has been described by reference to specific embodiments chosen for purposes of illustration, it should be apparent that numerous modifications can be made thereto by those skilled in the art without departing from the basic concept and scope of the invention.

I claim:

1. A liquid discharging device for discharging liquid stored on a bottom wall of an interior of a substantially horizontally extending compressed natural gas tank of a vehicle, the compressed natural gas tank being connected to an engine of the vehicle by a natural gas pipe inserted into a central portion of a side end of the tank for supplying natural gas to the engine, comprising:

a liquid discharging pipe independent of the natural gas pipe for discharging said liquid from said compressed natural gas tank to the outside of said compressed natural gas tank, said liquid discharging pipe being inserted into the central portion of the side end of the tank and having an open end which is open into said interior of said compressed natural gas tank at a position adjacent to an inner face of said bottom wall of said compressed natural gas tank, and a liquid discharging control valve arranged in said liquid discharging pipe to discharge said liquid due to the pressure of said natural gas in the compressed natural gas tank when said liquid discharging control valve is opened.

2. A liquid discharging device according to claim 1, wherein said compressed natural gas tank comprises a cylindrical central portion and opposed end portions, and said liquid discharging pipe extends through one of said opposed end portions.

3. A liquid discharging device according to claim 1, wherein a liquid level sensor is provided for detecting a level of said liquid in said compressed natural gas tank.

4. A liquid discharging device according to claim 1, wherein said compressed natural gas tank is inclined relative to the horizontal in such a manner that said liquid is collected around said open end of said liquid discharging pipe.

5. A liquid discharging device according to claim 1, wherein said liquid discharging pipe has a deformable portion which is deformed due to the force of gravity when said deformable portion is inserted into said compressed natural gas tank.

6. A liquid discharging device according to claim 5, wherein said deformable portion is comprised of a flexible rubber tube.

7. A liquid discharging device according to claim 5, wherein said deformable portion is comprised of a bellows-shaped tube.

8. A liquid discharging device according to claim 1, wherein a filter is arranged on said open end of said liquid discharging pipe.

9. The liquid discharging device of claim 1, wherein said natural gas pipe comprises an inlet and outlet pipe.

10. A vehicle comprising a substantially horizontally extending compressed natural gas tank connected to an engine of the vehicle by a natural gas pipe inserted into a central portion of a side end of the tank, for supplying natural gas to the engine, and a liquid discharging device for discharging liquid stored on a bottom wall of an interior of the compressed natural gas tank, wherein said liquid discharging device comprises:

a liquid discharging pipe independent of the natural gas pipe for discharging said liquid from said compressed natural gas tank to the outside of said compressed natural gas tank, said liquid discharging pipe being inserted into the central portion of the side end of the tank and having an open end which is open into said interior of said compressed natural gas tank at a position adjacent to an inner face of said bottom wall of said compressed natural gas tank, and a liquid discharging control valve arranged in said liquid discharging pipe to discharge said liquid due to the pressure of said natural gas in the compressed natural gas tank when said liquid discharging control valve is opened.

* * * * *